United States Patent
Tseng (10) Patent No.: US 12,323,725 B2
(45) Date of Patent: Jun. 3, 2025

(54) IMAGE OUTPUT SYNCHRONIZATION METHOD AND DEVICE

(71) Applicant: ADLINK TECHNOLOGY INC., Taoyuan (TW)

(72) Inventor: Yu-Sheng Tseng, Taoyuan (TW)

(73) Assignee: ADLINK TECHNOLOGY INC., Taoyuan (TW)

( * ) Notice: Subject to any disclaimer, the term of this patent is extended or adjusted under 35 U.S.C. 154(b) by 309 days.

(21) Appl. No.: 18/112,748

(22) Filed: Feb. 22, 2023

(65) Prior Publication Data

US 2024/0214508 A1 Jun. 27, 2024

(30) Foreign Application Priority Data

Dec. 23, 2022 (TW) .................................. 111149600

(51) Int. Cl.
*H04N 5/12* (2006.01)
*H04N 23/66* (2023.01)
*H04N 23/90* (2023.01)

(52) U.S. Cl.
CPC ............. *H04N 5/123* (2013.01); *H04N 23/66* (2023.01); *H04N 23/90* (2023.01)

(58) Field of Classification Search
CPC ........ H04N 5/123; H04N 23/66; H04N 23/90; H04N 5/06
See application file for complete search history.

(56) References Cited

U.S. PATENT DOCUMENTS

| | | | | |
|---|---|---|---|---|
| 2006/0013507 A1* | 1/2006 | Kaneko | .............. | H04N 25/7795 382/312 |
| 2014/0139740 A1* | 5/2014 | Ohba | ........................ | H04N 5/06 348/522 |
| 2016/0142592 A1* | 5/2016 | Muraki | ..................... | H04N 5/06 348/513 |
| 2018/0048833 A1* | 2/2018 | Neal | ......................... | H04N 5/33 |
| 2021/0287336 A1* | 9/2021 | Piadyk | ..................... | G06F 18/25 |

FOREIGN PATENT DOCUMENTS

| | | |
|---|---|---|
| CN | 1701596 A | 11/2005 |
| TW | 201313023 A | 3/2013 |

OTHER PUBLICATIONS

Taiwan Office Action issued in corresponding application No. 111149600, dated Oct. 12, 2023.

* cited by examiner

*Primary Examiner* — Nhan T Tran
(74) *Attorney, Agent, or Firm* — Maschoff Brennan (57) ABSTRACT

An image output synchronization method, performed by a programmable logic circuit connected to an oscillator, includes: configuring a count value according to a designated frame rate and a frequency of the oscillator generating a count signal by each one of a plurality of frame controllers; generating a synchronization signal periodically and outputting the synchronization signal to the frame controllers by a clock generator; and performing a synchronization procedure on a camera by each one of the frame controllers when triggered by the synchronization signal every time, with the synchronization procedure including: triggered by the count signal of the oscillator to control a frame control signal outputted to the camera according to the count value and a width of the count signal.

16 Claims, 8 Drawing Sheets

IMAGE OUTPUT SYNCHRONIZATION METHOD AND DEVICE

CROSS-REFERENCE TO RELATED APPLICATIONS

This non-provisional application claims priority under 35 U.S.C. § 119(a) on Patent Application No(s). 111149600 filed in Republic of China (ROC) on Dec. 23, 2022, the entire contents of which are hereby incorporated by reference.

BACKGROUND

1. Technical Field

This disclosure relates to an image output synchronization method and device.

2. Related Art

Multiple cameras are installed on robots or self-driving cars, and images generated by these cameras may be used for simultaneous localization and mapping (SLAM). For example, the images may be used for object detection, recognition of traffic lights or positioning, etc. Take self-driving car for example, the cameras may be installed on front, back, left and right sides of the vehicle body.

Since these cameras may have different frame rates (FPS), the computing element performing SLAM is unable to obtain the images outputted by the cameras in synchronization. Therefore, there is a large time difference of rising edges and phase difference between the image frames outputted by different cameras.

SUMMARY

Accordingly, this disclosure provides an image output synchronization method and device.

According to one or more embodiment of this disclosure, an image output synchronization method, performed by a programmable logic circuit connected to an oscillator, includes: configuring a count value according to a designated frame rate and a frequency of the oscillator generating a count signal by each one of a plurality of frame controllers; generating a synchronization signal periodically and outputting the synchronization signal to the frame controllers by a clock generator; and performing a synchronization procedure on a camera by each one of the frame controllers when triggered by the synchronization signal every time, with the synchronization procedure including: triggered by the count signal of the oscillator to control a frame control signal outputted to the camera according to the count value and a width of the count signal.

According to one or more embodiment of this disclosure, an image output synchronization device includes: a memory and a programmable logic circuit. The memory is configured to store a configuration. The programmable logic circuit is connected to the memory, and is configured to load the configuration to perform: configuring a count value according to a designated frame rate and a frequency of the oscillator generating a count signal by each one of a plurality of frame controllers; generating a synchronization signal periodically and outputting the synchronization signal to the frame controllers by a clock generator; and performing a synchronization procedure on a camera when triggered by the synchronization signal every time by each one of the frame controllers, with the synchronization procedure including: triggered by the count signal of the oscillator to control a frame control signal outputted to the camera according to the count value and a width of the count signal.

In view of the above description, even if the cameras have different frame rates, the image output synchronization method and device according to one or more embodiments of the present disclosure may allow output frame rates of the cameras to be in synchronization periodically.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Mobile vehicles such as robots, cars (for example, self-driving car) etc. are installed with a plurality of cameras for obtaining images from different angles. These cameras may have different frame rates. The present disclosure provides an image output synchronization method and device, which may be applied to said cameras to synchronize frame signals outputted by these cameras.

Figure 1:
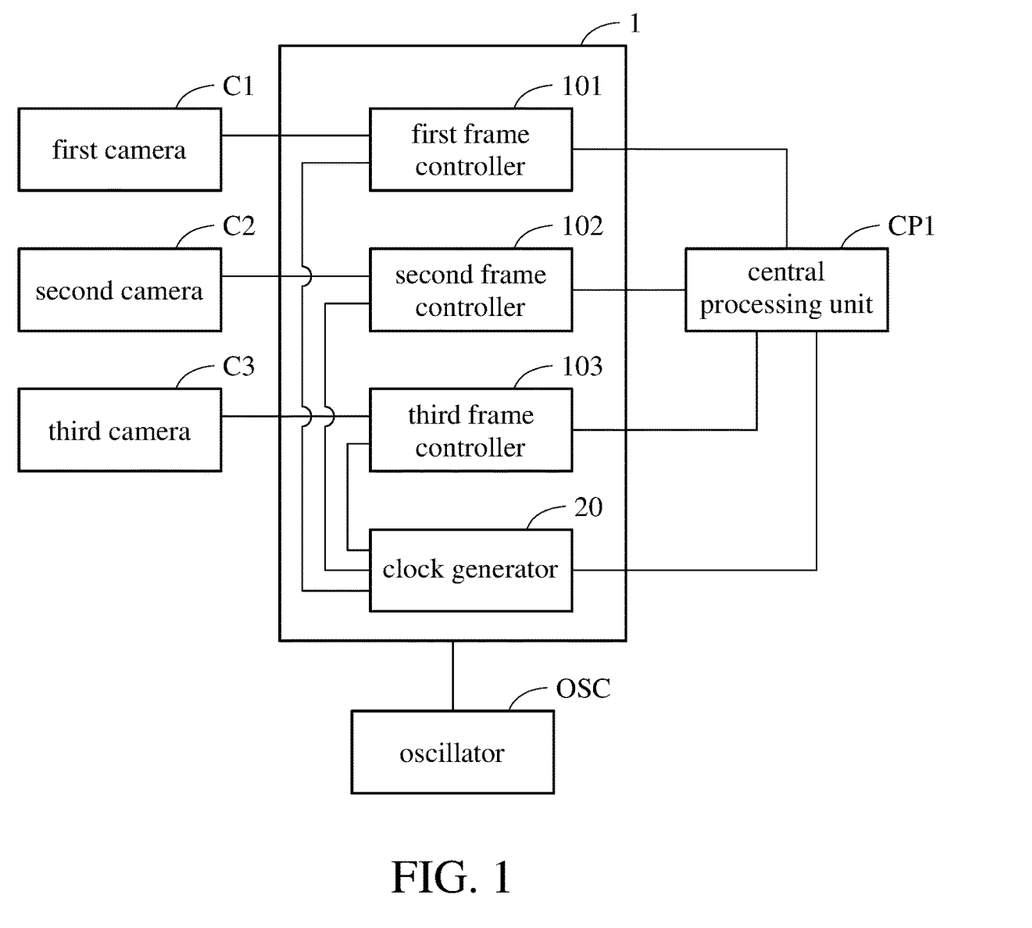
FIG. 1 is a functional block diagram illustrating an operating environment of an image output synchronization device according to an embodiment of the present disclosure.
Figure 2:
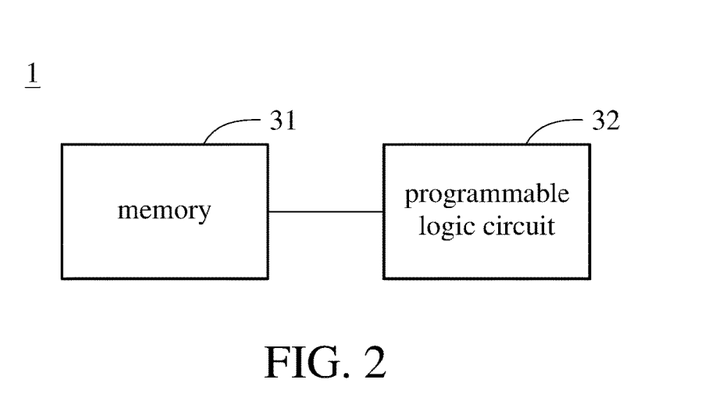
FIG. 2 is a block diagram illustrating an image output synchronization device according to an embodiment of the present disclosure.

Please refer to FIG. 1 and FIG. 2, wherein FIG. 1 is a functional block diagram illustrating an operating environment of an image output synchronization device according to an embodiment of the present disclosure, and FIG. 2 is a block diagram illustrating an image output synchronization device according to an embodiment of the present disclosure. The image output synchronization device 1 includes a first frame controller 101, a second frame controller 102, a third frame controller 103 and a clock generator 20. The clock generator 20 is connected to the first frame controller 101, the second frame controller 102 and the third frame controller 103, wherein the first frame controller 101 to the third frame controller 103 and the clock generator 20 may be stored in the image output synchronization device 1 in the form of one or more configurations. Hardware elements of the image output synchronization device 1 includes a memory 31 and a programmable logic circuit 32. The memory 31 is a non-volatile memory, such as a read-only memory or a flash memory, wherein the read-only memory may include an erasable programmable read only memory (EPROM), an electrically erasable programmable read only memory (EEPROM) etc. The programmable logic circuit 32 may be a field programmable gate array (FPGA). Alternatively, the image output synchronization device 1 may be a complex programmable logic device (CPLD). The memory 31 stores configuration(s) of the first frame controller 101 to the third frame controller 103 and the clock generator 20, and the programmable logic circuit 32 loads the configuration(s) to perform the image output synchronization method described below. In other words, after the programmable logic circuit 32 loads the configuration(s), the programmable logic circuit 32 may have the configuration(s) of the first frame controller 101 to the third frame controller 103 and the clock generator 20 to perform the image output synchronization method described below.

One frame controller may be connected to one camera. Take FIG. 1 for example, the first frame controller 101 is connected to the first camera C1, the second frame controller 102 is connected to the second camera C2, and the third frame controller 103 is connected to the third camera C3. The connections between the frame controllers and the cameras may be implemented through pins of the image output synchronization device 1. The first frame controller 101, the second frame controller 102, the third frame controller 103 and the clock generator 20 may be further connected to a central processing unit CP1, and the connections to the central processing unit CP1 may be implemented through pins of the image output synchronization device 1. The central processing unit CP1 is disposed on a mobile vehicle, and may be a central processing unit (CPU) of the car computer. The image output synchronization device 1 may be connected to an oscillator OSC. In addition to the connections described above, the image output synchronization device 1 may further be connected to the central processing unit CP1 through inter-integrated circuit ($I^2C$) interface, for the user to adjust a designated frame rate of any one of the first frame controller 101 to the third frame controller 103 through the user interface. It should be noted that, the numbers of frame controllers and the cameras shown in FIG. 1 are exemplarily, the present disclosure is not limited thereto.

The clock generator 20 may be regarded as a real-time clock (RTC). Based on the real-time clock, the clock generator 20 may periodically generate a synchronization signal and output the synchronization signal to each one of the first frame controller 101, the second frame controller 102 and the third frame controller 103 to trigger each one of the first frame controller 101, the second frame controller 102 and the third frame controller 103 to control frame control signals outputted to the first camera C1, the second camera C2 and the third camera C3, respectively.

Figure 3:
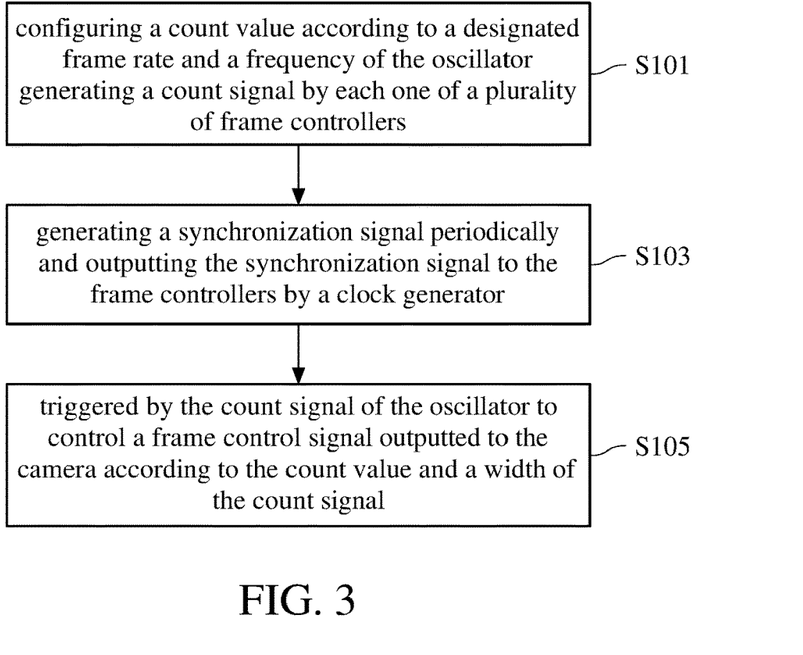
FIG. 3 is a flowchart illustrating an image output synchronization method according to an embodiment of the present disclosure.

To explain the above contents in more detail, please refer to FIG. 1 and FIG. 3, wherein FIG. 3 is a flowchart illustrating an image output synchronization method according to an embodiment of the present disclosure. As shown in FIG. 3, the image output synchronization method includes: step S101: configuring a count value according to a designated frame rate and a frequency of the oscillator generating a count signal by each one of a plurality of frame controllers; step S103: generating a synchronization signal periodically and outputting the synchronization signal to the frame controllers by a clock generator; and step S105: triggered by the count signal of the oscillator to control a frame control signal outputted to the camera according to the count value and a width of the count signal.

In step S101, the first frame controller 101, the second frame controller 102 and the third frame controller 103 configure the count values according to the frequency of the count signal generated by the oscillator OSC and the corresponding designated frame rate. Specifically, calculating the count value may be performed by dividing the frequency of the count signal generated by the oscillator OSC by the corresponding designated frame rate. The count signal is, for example, a rising-edge trigger of a clock signal generated by the oscillator OSC, and the frequency is, for example, 20 MHz, the present disclosure is not limited thereto. The designated frame rate is, for example, a camera frame rate set by the user through the central processing unit CP1. A numerical range of the designated frame rate may be from 1 frame per second (FPS) to 60 FPS. Since each frame controller corresponds to one camera, the first frame controller 101, the second frame controller 102 and the third frame controller 103 may use different designated frame rates to configure the count values. That is, one camera corresponds to one count value.

In step S103, the clock generator 20 transmits the synchronization signal to the first frame controller 101, the second frame controller 102 and the third frame controller 103. The synchronization signal may be used as the synchronization signal of the sliding window of the output frame rates of the first camera C1, the second camera C2 and the third camera C3.

In step S105, every time each one of the first frame controller 101, the second frame controller 102 and the third frame controller 103 is triggered by the synchronization signal, the first frame controller 101, the second frame controller 102 and the third frame controller 103 perform a synchronization procedure on the first camera C1, the second camera C2 and the third camera C3, respectively. The synchronization procedure includes each one of the first frame controller 101, the second frame controller 102 and the third frame controller 103 triggered by the count signal generated by the oscillator OSC to control the respective frame control signal outputted to the first camera C1, the second camera C2 and the third camera C3 according to their respective count value and the width of the count signal.

Take the first frame controller 101 for example, in step S105, after the first frame controller 101 is triggered by the count signal generated by the oscillator OSC, the first frame controller 101 controls a potential of the frame control signal outputted to the first camera C1 according to the count value and the width of the count signal described above. For example, the first frame controller 101 may output a current pulse of the frame control signal or form a new pulse by controlling the potential of the frame control signal. Through performing step S105 by each one of the first frame controller 101, the second frame controller 102 and the third frame controller 103, the first camera C1, the second camera C2 and the third camera C3 may output image frames to the central processing unit CP1 in synchronization (e.g. simultaneously) after receiving the frame control signal.

Through the above embodiment, even multiple cameras have different frame rates, the cameras may still output image frames to the central processing unit in synchronization, thereby allowing all cameras to stably output image frames with expected frame rates.

In addition to the above embodiment, the clock generator 20 may transmit an interruption signal to the central processing unit CP1 at the same time of generating the synchronization signal, for the central processing unit CP1 to synchronize time (i.e. timing, time point) with the image output synchronization device 1 based on interrupt service routine (ISR). In other words, assuming that a transmission frequency of the synchronization signal is one pulse per second, then the synchronization signal may be used to for the image output synchronization device 1 with the central processing unit CP1 to be synchronized every second.

In addition, each one of the first frame controller 101, the second frame controller 102 and the third frame controller 103 may transmit the interruption signal to the central processing unit CP1 and at the same time output the frame control signal to notify the central processing unit CP1 that each one the first camera C1, the second camera C2 and the third camera C3 is going to output one image frame. The central processing unit CP1 may request the image output synchronization device 1 for a timestamp corresponding to a previous frame after receiving the interruption signal, thereby determining time point of each one of the first frame controller 101, the second frame controller 102 and the third frame controller 103 outputting the frame control signals. In other words, the central processing unit CP1 may accurately determine time point corresponding to the received image frame.

Figure 4:
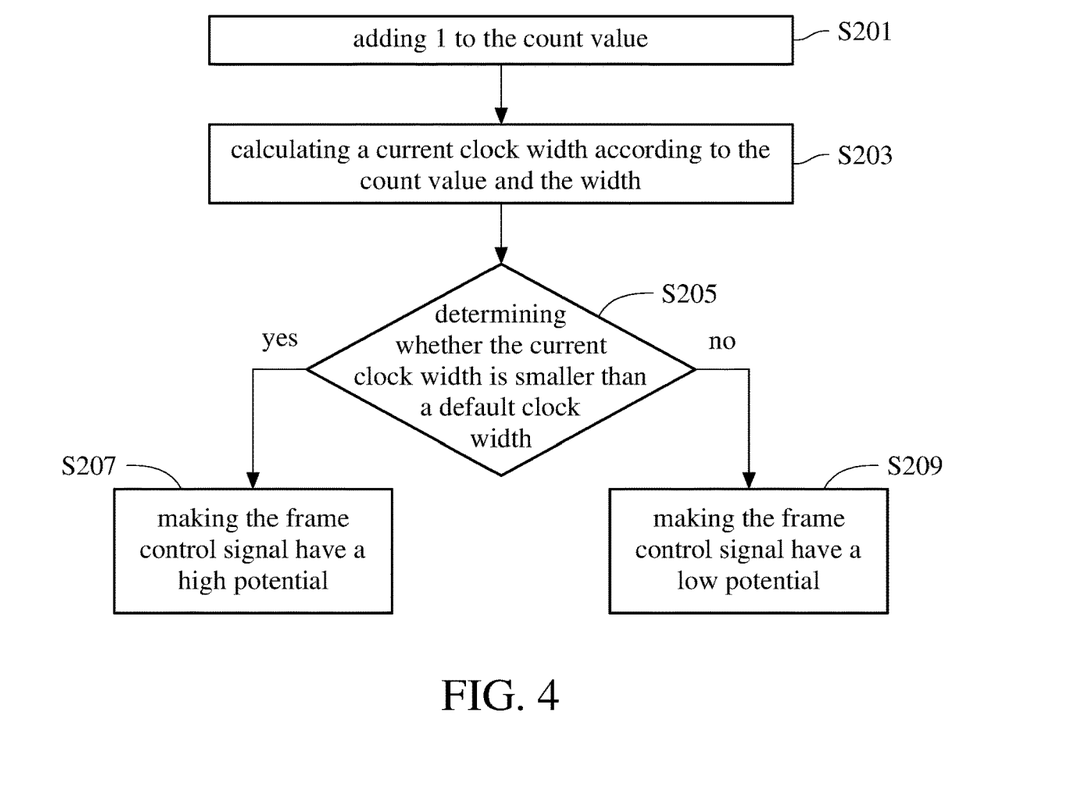
FIG. 4 is a flowchart illustrating method of controlling frame control signal according to an embodiment of the present disclosure.

Please refer to FIG. 1 and FIG. 4, wherein FIG. 4 is a flowchart illustrating method of controlling frame control signal according to an embodiment of the present disclosure. FIG. 4 may be considered as a detailed flowchart illustrating an embodiment of controlling the frame control signal outputted to the camera according to the width of the count signal and the count value as described in step S105 of FIG. 3. As shown in FIG. 4, the method of controlling the frame control signal includes: step S201: adding 1 to the count value; step S203: calculating a current clock width according to the count value and the width; step S205: determining whether the current clock width is smaller than a default clock width; if the determination result of step S205 is "yes", performing step S207: making the frame control signal have a high potential; and if the determination result of step S205 is "no", performing step S209: making the frame control signal have a low potential. The above content is adapted to each the frame controller, and for better understanding, the following uses the first frame controller 101 as an example for description.

In step S201, the first frame controller 101 adds 1 to the configured count value to generate an updated count value, wherein the updated count value indicates a cumulative number of clocks. In step S203, the first frame controller 101 calculates the current clock width according to the count value and the width of the count signal. In other words, the current clock width indicates a total clock width corresponding to the number of clocks that have elapsed.

In step S205, the first frame controller 101 determines whether the current clock width is smaller than the default clock width, wherein the default clock width is, for example, 20 ms, but the present disclosure is not limited thereto.

If the first frame controller 101 determines that the current clock width is smaller than the default clock width, then in step 207, the first frame controller 101 controls the frame control signal to have high potential. That is, the first frame controller 101 maintains the potential of the frame control signal at high potential. If the first frame controller 101 determines that the current clock width is not smaller than the default clock width, then in step 209, the first frame controller 101 controls the frame control signal to have low potential. That is, the first frame controller 101 lowers the potential of the frame control signal.

In short, in step S207, the first frame controller 101 makes the frame control signal have high potential for the current clock width to reach the default clock width; and in step S209, the first frame controller 101 makes the frame control signal have low potential for the frame control signal having the current clock width reaching the default clock width to form a pulse. It should be noted that, "reach" in the present disclosure indicates equal to or greater than.

Figure 5:
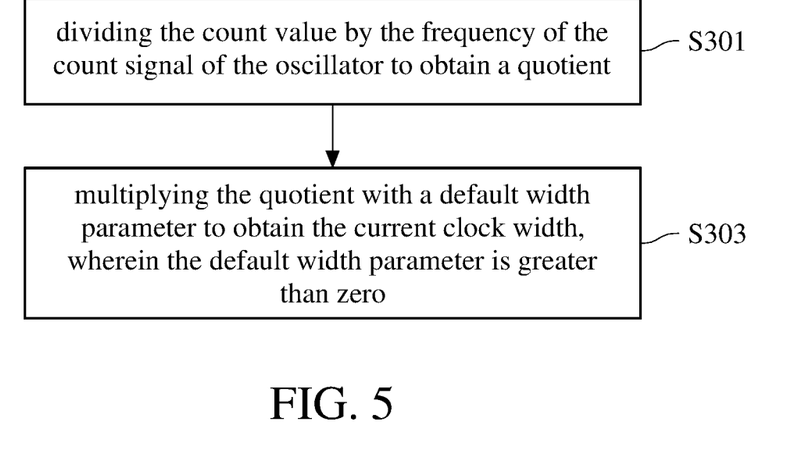
FIG. 5 is a flowchart illustrating method of calculating a current clock width according to an embodiment of the present disclosure.

Please refer to FIG. 1 and FIG. 5, wherein FIG. 5 is a flowchart illustrating method of calculating a current clock width according to an embodiment of the present disclosure. FIG. 5 may be considered as a detailed flowchart illustrating an embodiment of controlling the frame control signal outputted to the camera according to the width of the count signal and the count value, and may be an embodiment of step S203 of FIG. 4. As shown in FIG. 5, the method of calculating the current clock width includes: step S301: dividing the count value by the frequency of the count signal of the oscillator to obtain a quotient; and step S303: multiplying the quotient with a default width parameter to obtain the current clock width, wherein the default width parameter is greater than zero. The above content is adapted to each frame controller, and for better understanding, the following uses the first frame controller 101 as an example for description.

In short, in step S301 and step S303, the first frame controller 101 may calculate the current clock width with equation (1) below:

$$PW = \frac{c}{Freq_{osc}} \times N \qquad \text{equation (1)}$$

wherein PW is the current clock width; C is the count value; $Freq_{osc}$ is the frequency of the count signal generated by the oscillator OSC; N is the default width parameter, and may be a positive integer.

Figure 6:
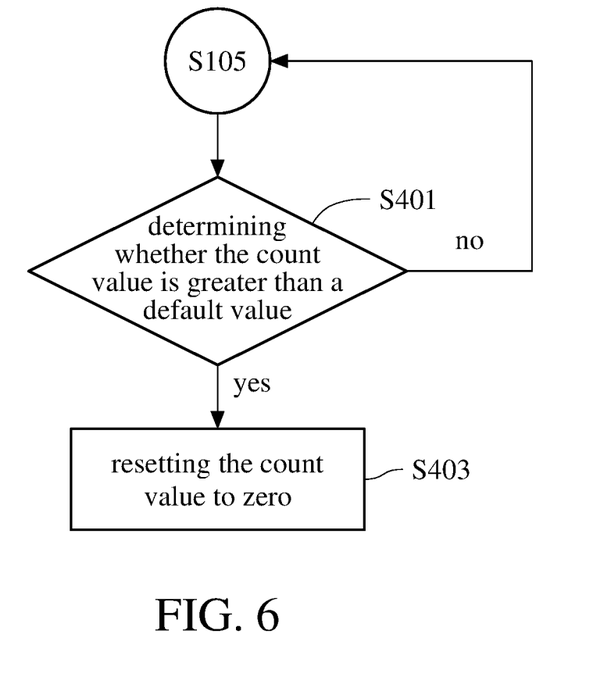
FIG. 6 is a flowchart illustrating an image output synchronization method according to another embodiment of the present disclosure.

Please refer to FIG. 1 and FIG. 6, wherein FIG. 6 is a flowchart illustrating an image output synchronization method according to another embodiment of the present disclosure. The embodiment of FIG. 6 includes steps S101, S103 and S105 shown in FIG. 2 and further includes steps S401 and S403 following step S105. The synchronization procedure may further include step S401: determining whether the count value is greater than a default value. If the determination result of step S401 is "yes", performing step S403: resetting the count value to zero; and if the determination result of step S401 is "no", performing step S105 of FIG. 3 again, wherein step S105 of FIG. 6 may include steps shown in FIG. 4. The above content is adapted to each frame controller, and for better understanding, the following uses the first frame controller 101 as an example for description.

In step S401, the first frame controller 101 determines whether the count value is greater than the default value to determine whether the first camera C1 has finished outputting the current image frame to the central processing unit CP1. The default value may be obtained according to a value of the frequency of the count signal generated by the oscillator OSC divided by the designated frame rate. Further, the default value may be obtained by following equation (2):

$$Thres = \frac{Freq_{osc}}{FPS} - 1 \qquad \text{equation (2)}$$

wherein Thres is the default value; $Freq_{osc}$ is the frequency of the count signal generated by the oscillator OSC; FPS is the designated frame rate. In other words, the frame controllers may correspond to different default values.

If the count value is greater than the default value, in step S403, the first frame controller 101 resets the count value to zero to reset the cumulative number of clock pulses to zero. On the contrary, if the count value is not greater than the default value, the first frame controller 101 performs step S105 of FIG. 3 again. That is, if the count value is not greater than the default value, the first frame controller 101 waits for another count signal to be triggered by the another count signal again, thereby controlling the frame control signal outputted to the first camera C1 according to the count value and the width of the count signal.

Figure 7:
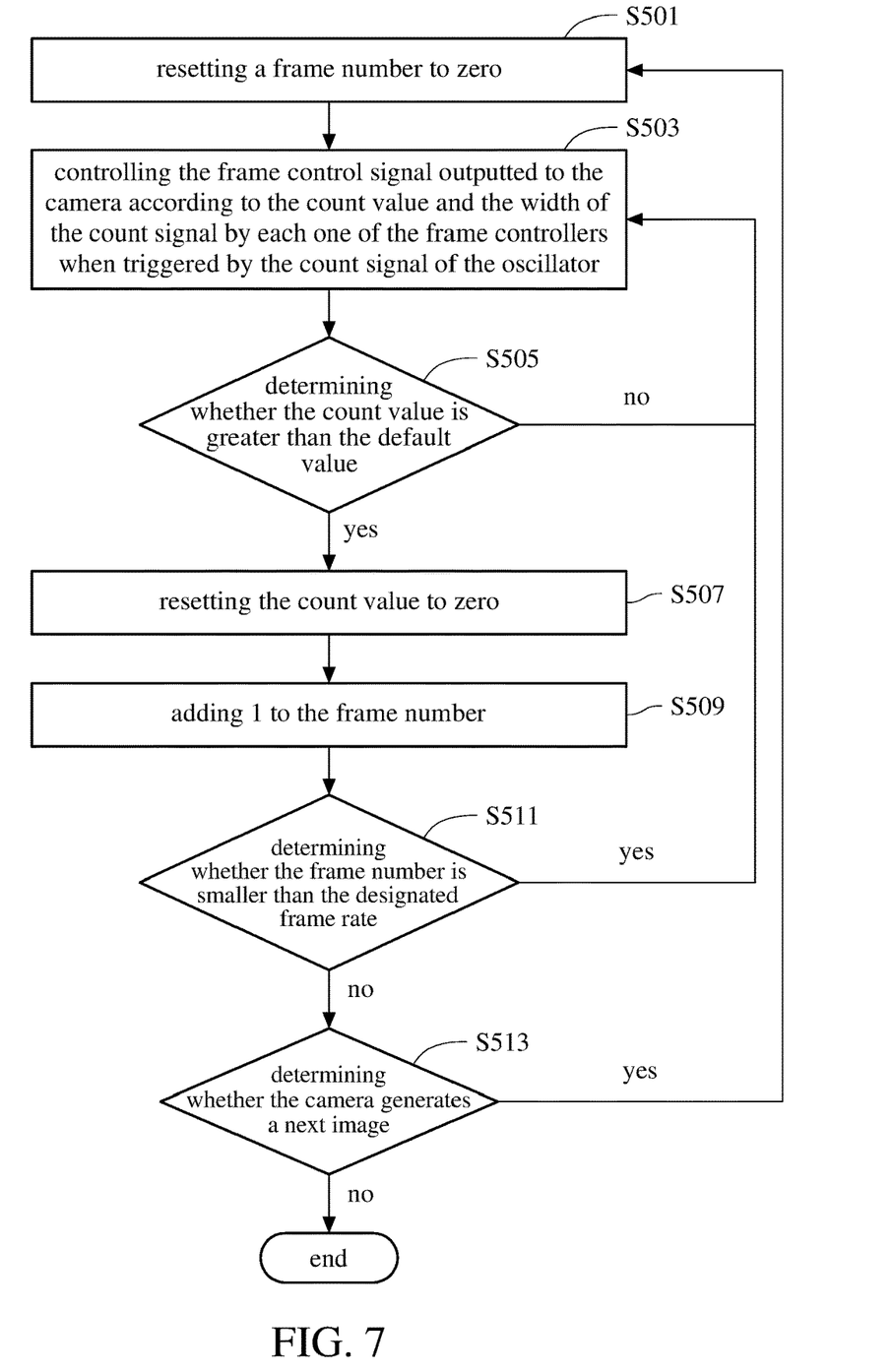
FIG. 7 is a flowchart illustrating an image output synchronization method according to yet another embodiment of the present disclosure.

Please refer to FIG. 1 and FIG. 7, wherein FIG. 7 is a flowchart illustrating the synchronization procedure according to yet another embodiment of the present disclosure. The synchronization procedure described above may further include: step S501, step S505, step S507, step S509, step S511 and step S513. Specifically, as shown in FIG. 7, the synchronization procedure includes: step S501: resetting a frame number to zero; step S503: controlling the frame control signal outputted to the camera according to the count value and the width of the count signal when triggered by the count signal of the oscillator; step S505: determining whether the count value is greater than the default value; if the determination result of step S505 is "yes", performing step S507: resetting the count value to zero; step S509: adding 1 to the frame number; step S511: determining whether the frame number is smaller than the designated frame rate; if the determination result of step S511 is "yes", performing step S503; if the determination result of step S511 is "no", performing step S513: determining whether the camera generates a next image; if the determination result of step S513 is "yes", performing step S501; if the determination result of step S513 is "no", ending the method; and if the determination result of step S505 is "no", performing step S503. Step S503 of FIG. 7 is the same as step S105 of FIG. 3, and may include steps shown in FIG. 4; step S505 and step S507 may be the same as step S401 and step S403 shown in FIG. 6, respectively. Their repeated descriptions are omitted herein. In addition, step S507 of FIG. 7 is illustrated as performed before step S509, but step S507 may also be performed after step S509 or performed in parallel with step S509. The above content is adapted to each frame controller, and for better understanding, the following uses the first frame controller 101 as an example for description.

After the first frame controller 101 is triggered by the synchronization signal, as shown in step S501 and step S503, before controlling the frame control signal outputted to the first camera C1 according to the count value and the width of the count signal when triggered by the count signal of the oscillator OSC, the first frame controller 101 may reset the frame number to zero.

Then, when the first frame controller 101 determines that the count value is greater than the default value in step S505, the first frame controller 101 performs step S507 and step S509. In step S509, the first frame controller 101 increases the frame number by 1 to update the frame number, wherein the updated frame number indicates that the first camera C1 has finished outputting the current image frame.

Then, in step S511, the first frame controller 101 determines whether the updated frame number is smaller than the numerical value of the designated frame rate of the first camera C1 to determine whether the first camera C1 has outputted all image frames. For example, assuming that the designated frame rate is 30 (fps), then in step S511, the first frame controller 101 determines whether the frame number is smaller than 30.

If the first frame controller 101 determines that the frame number is smaller than the designated frame rate, then the first frame controller 101 performs step S503 again. That is, the first frame controller 101 waits to be triggered by the count signal to control the frame control signal outputted to the first camera C1 according to the count value and the width of the count signal again. On the contrary, if the first frame controller 101 determines that the frame number is not smaller than the designated frame rate, the first frame controller 101 may further perform step S513 to determine whether the first camera C1 generates the next image according to the power on/off status of the first camera C1, thereby determining whether the first camera C1 continues to output image frames to the central processing unit CP1. If the status of the first camera C1 is "power on", the first frame controller 101 determines that the first camera C1 generates the next image, and the first frame controller 101 may perform step S501 again; on the contrary, if the status of the first camera C1 is "power off", the first frame controller 101 may end the process. It should be noted that, step S513 is selectively performed. When the determination result of step S511 is "no", the first frame controller 101 may also directly end the process.

Figure 8:
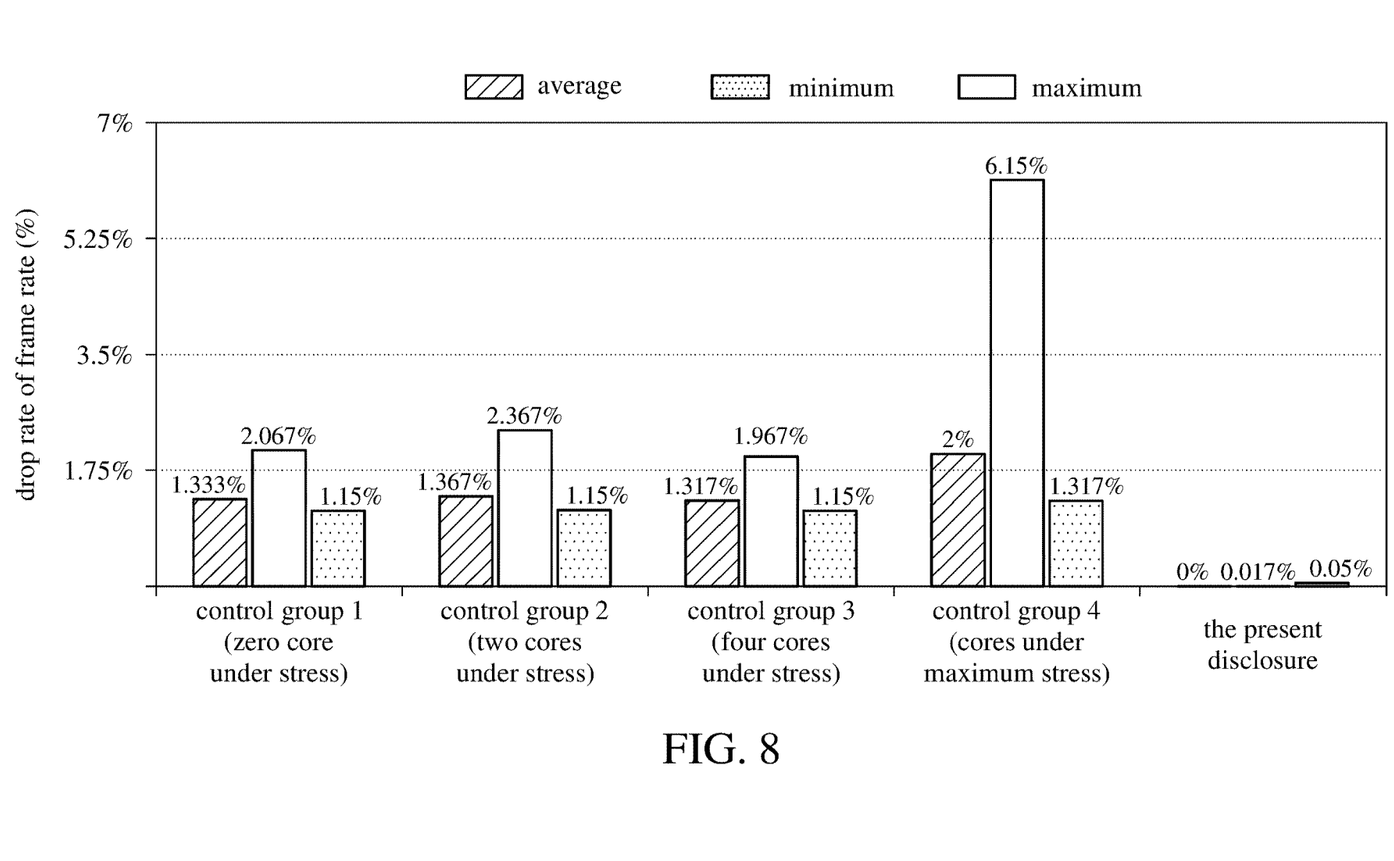
FIG. 8 is a histogram showing frame rate drops under different usage scenarios.

Please refer to FIG. 8, wherein FIG. 8 is a histogram showing frame rate drops under different usage scenarios. The experiment of FIG. 8 is done on one camera, wherein the designated frame rate of the camera is 60 fps, the measurement window size is 50 samples, and the actual output frame rates corresponding to the three control groups and the present disclosure are observed using an oscilloscope. Control group 1 is the scenario of none of the cores of the central processing unit is under stress load; control group 2 is the scenario of two cores of the central processing unit are under stress load; control group 3 is the scenario of four cores of the central processing unit are under stress load; control group 4 is the scenario of the cores of the central processing unit are under full stress load; and the present disclosure in FIG. 8 is the scenario of one or more embodiments above of controlling the frame control signal outputted to the camera by using the image output synchronization device.

As shown in table 1 below, the actual output frame rates of the four control groups are all lower than that of the present disclosure. Further, even though control group 1 represents the scenario of none of the cores the central processing unit is under stress load, since the central processing unit still runs other programs (for example, the operating system), the output frame rate of control group 1 is still lower than that of the present disclosure.

TABLE 1

|  | control group 1 | control group 2 | control group 3 | control group 4 | the present disclosure |
|---|---|---|---|---|---|
| Average | 59.2 | 59.18 | 59.21 | 59.00 | 60 |
| Minimum | 58.76 | 58.58 | 58.82 | 56.31 | 59.99 |
| Maximum | 59.31 | 59.31 | 59.31 | 59.21 | 60.03 |

Further, the drop rate of the frame rate obtained based on table 1 is shown in FIG. 8, wherein the drop rates of the four control groups are at least 1%, and the minimum actual frame rate drops by as much as 6.15%. On the contrary, the drop rate of the present disclosure is close to 0%.

It should be noted that, the drop rate of the frame rate may be obtained through equation (3) below:

$$\text{Drop Rate} = \frac{FPS_{expect} - FPS_{actual}}{FPS_{expect}} \times 100\% \qquad \text{equation (3)}$$

wherein "Drop Rate" is the drop rate of the frame rate; $FPS_{expect}$ is the designated frame rate; $FPS_{actual}$ is the actual output frame rate measured by the oscilloscope.

It may be known from FIG. 8 and table 1 that, with the image output synchronization device and the image output synchronization method according to one or more embodiments of the present disclosure, the actual output frame rate may be maintained at a value close to the designated frame rate.

Figure 9:
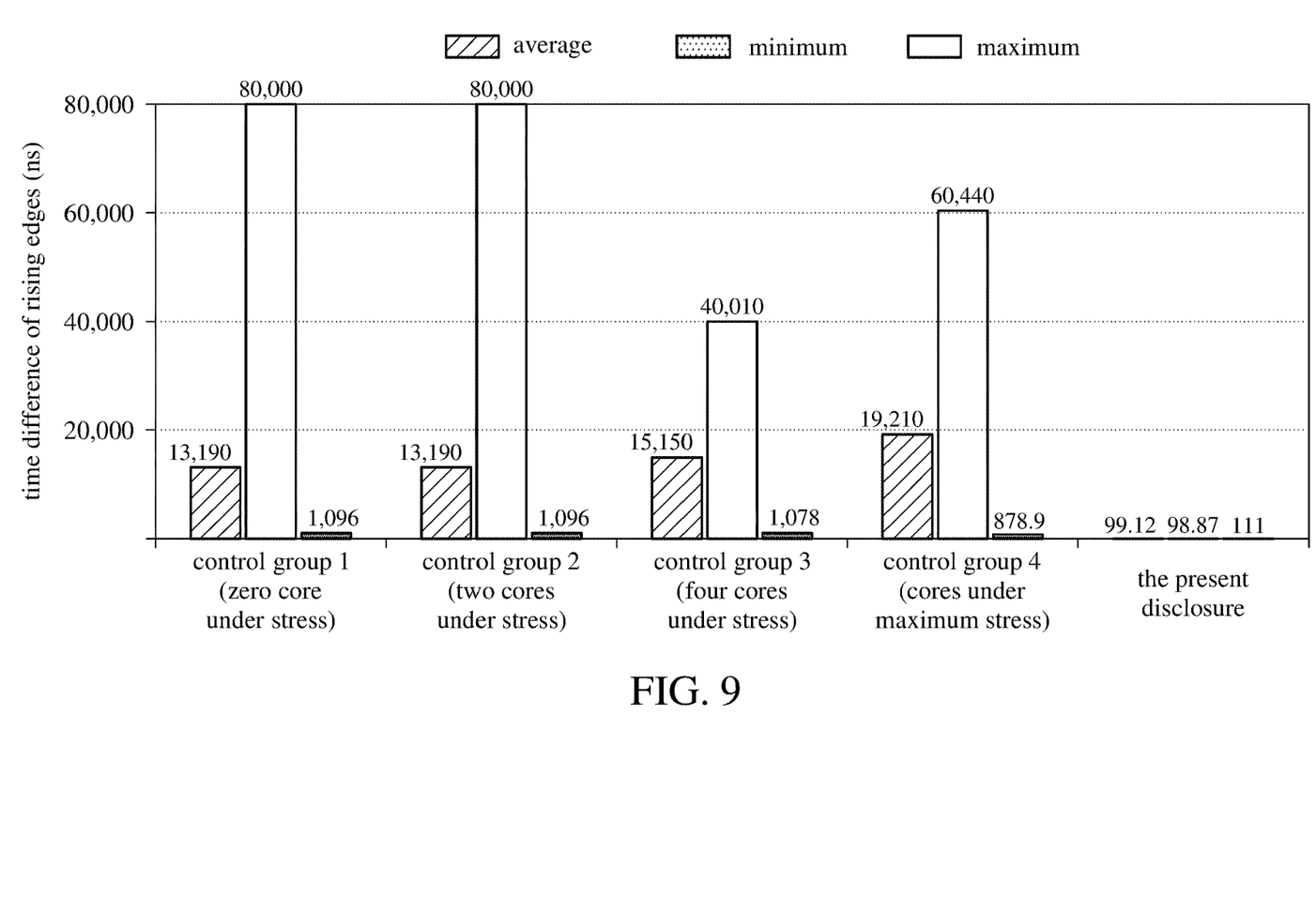
FIG. 9 is a histogram showing the rising-edge time difference under different usage scenarios.

Please refer to FIG. 9, FIG. 9 is a histogram showing the rising-edge time difference under different usage scenarios. The experiment of FIG. 9 is done on two cameras, with one of the camera having the designated frame rate of 10 (fps), and the other camera having the designated frame rate of 15 (fps); the measurement window size is 50 samples, and an oscilloscope is used to measure time difference of the rising-edge of the frame control signals of these two cameras, wherein the unit is nanosecond. The scenario of the four control groups and the present disclosure in FIG. 9 are the same as that of FIG. 8. As shown in FIG. 9, in the control groups, the maximum time difference of the rising-edge of two cameras with different designated frame rates is up to 80000 nanoseconds; on the contrary, the maximum time difference of the rising-edge of the present disclosure is approximately 100 nanoseconds and the minimum time difference is not greater than 111 nanoseconds. It may be known from FIG. 9 that, the image output synchronization device and the image output synchronization method according to one or more embodiments of the present disclosure may be applied to lower the time difference in rising edges of the frame control signals corresponding to cameras with different frame rates.

Figure 10:
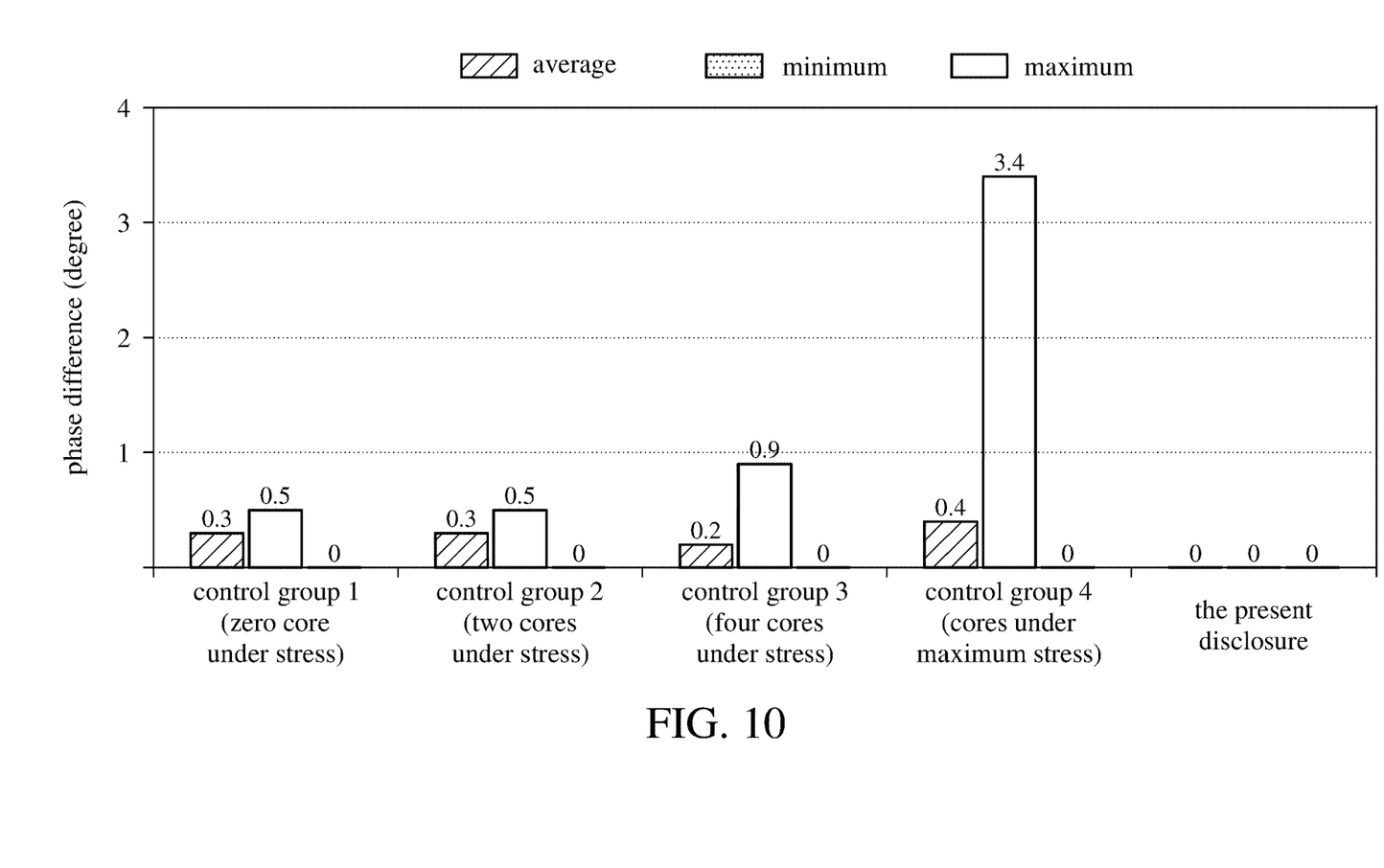
FIG. 10 is a histogram showing the displacement under different usage scenarios.

Please refer to FIG. 10, wherein FIG. 10 is a histogram showing the displacement under different usage scenarios. The experiment of FIG. 10 is done on two cameras, wherein the designated frame rate of one of the camera is 10 (fps), and the designated frame rate of the other camera is 15 (fps), the measurement window size is 50 samples, and the measured subject is the phase difference between image frames outputted by these two cameras. The scenario of the four control groups and the present disclosure in FIG. 10 are the same as that of FIG. 8. As shown in FIG. 10, the maximum phase difference among the control groups is up to 3.4 degrees, and the phase differences of the present disclosure are approximately 0 degree. It may be known from FIG. 10 that, the image output synchronization device and the image output synchronization method according to one or more embodiments of the present disclosure may be applied to maintain the actual output frame rate at a value close to the designated frame rate, and the phase differences of output image frames between cameras may be maintain at around 0 degree.

Figure 11:
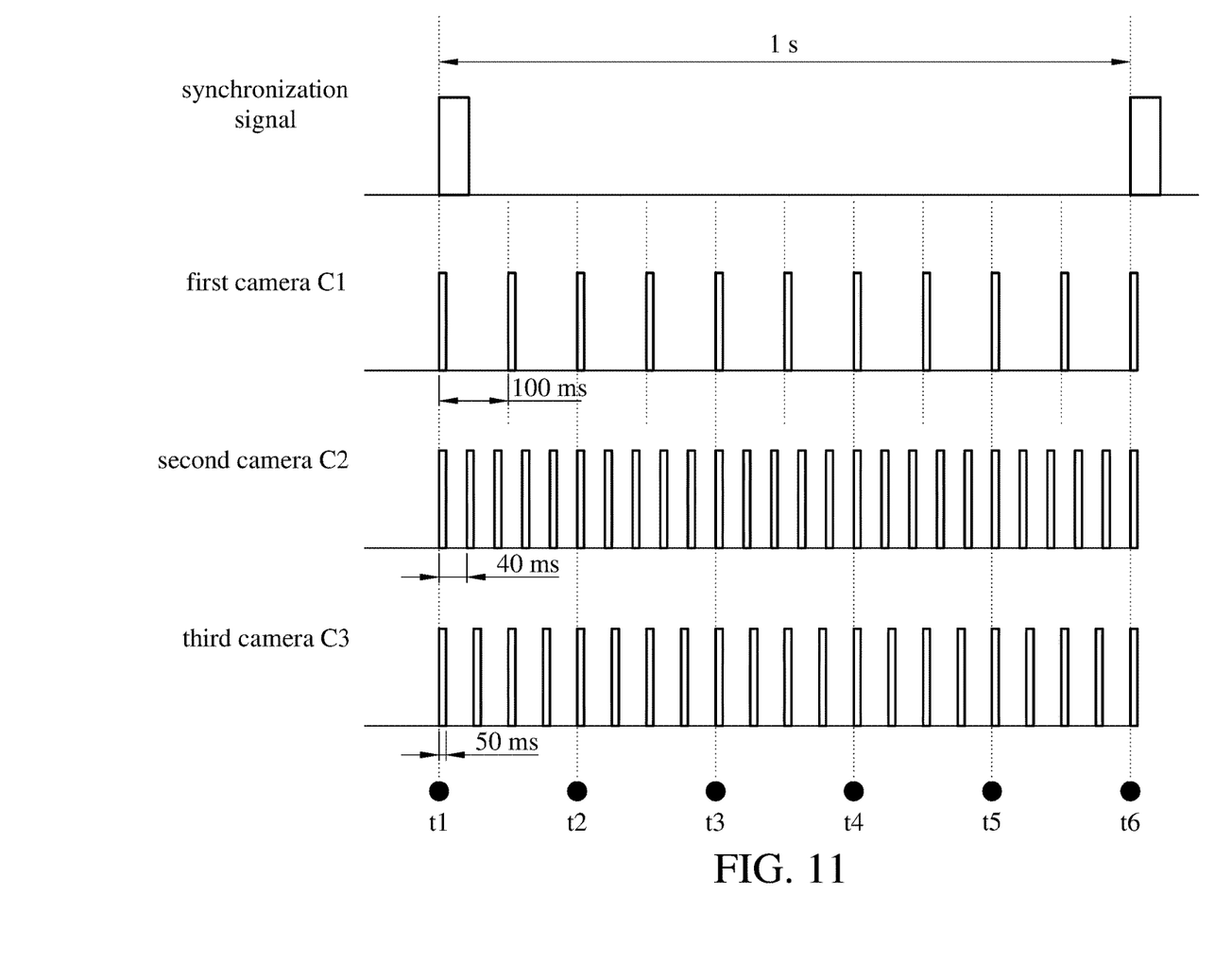
FIG. 11 is a schematic diagram illustrating output signals of cameras synchronized according to an embodiment of the present invention.

Please refer to FIG. 11, wherein FIG. 11 is a schematic diagram illustrating output signals of cameras synchronized according to an embodiment of the present invention. FIG. 11 uses the first camera C1, the second camera C2 and the third camera C3 in FIG. 1 for example, wherein the designated frame rate of the first camera C1 is 10 (fps); the designated frame rate of the second camera C2 is 25 (fps); the designated frame rate of the third camera C3 is 20 (fps). In FIG. 11, the output period of the synchronization signal is 1 second, and the 1 second is divided into six time points t1 to t6.

As shown in FIG. 11, the rising edges of the output signals of the first camera C1, the second camera C2 and the third camera C3 at the six time points t1 to t6 are aligned with each other, which means the first camera C1, the second camera C2 and the third camera C3 respectively outputs one image frame simultaneously at each one of the six time points t1 to t6. It may be known from FIG. 11 that, the first camera C1, the second camera C2 and the third camera C3 may output image frames at the same time, and the phase difference between the image frames outputted by the first camera C1, the second camera C2 and the third camera C3 may be 0 degree.

In view of the above description, even if the cameras have different frame rates, the image output synchronization method and device according to one or more embodiments of the present disclosure may allow output frame rates of the cameras to be in synchronization periodically. In addition, the image output synchronization method and device according to one or more embodiments of the present disclosure may allow the actual output frame rates to be maintained at values close to the designated frame rates, thereby lowering the time difference between rising edges of image frames outputted by different cameras, and the phase differences between the output image frames of the cameras may be maintained to be close to 0 degree.

What is claimed is:

1. An image output synchronization method, performed by a programmable logic circuit connected to an oscillator, comprising:
configuring a count value according to a designated frame rate and a frequency of the oscillator generating a count signal by each one of a plurality of frame controllers;
generating a synchronization signal periodically and outputting the synchronization signal to the frame controllers by a clock generator; and
performing a synchronization procedure on a camera by each one of the frame controllers when triggered by the synchronization signal every time, with the synchronization procedure comprising: triggered by the count signal of the oscillator to control a frame control signal outputted to the camera according to the count value and a width of the count signal,
wherein controlling the frame control signal outputted to the camera according to the count value and the width of the count signal comprises:
adding 1 to the count value;

calculating a current clock width according to the count value and the width;
determining whether the current clock width is smaller than a default clock width;
making the frame control signal have a high potential if the current clock width is smaller than the default clock width; and
making the frame control signal have a low potential if the current clock width is not smaller than the default clock width.

2. The image output synchronization method according to claim 1, wherein calculating the current clock width according to the count value and the width comprises:
dividing the count value by the frequency of the count signal of the oscillator to obtain a quotient; and
multiplying the quotient with a default width parameter to obtain the current clock width, wherein the default width parameter is greater than zero.

3. The image output synchronization method according to claim 1, wherein the synchronization procedure further comprises:
determining whether the count value is greater than a default value after controlling the frame control signal;
waiting to be triggered by the count signal to control the frame control signal outputted to the camera according to the count value and the width of the count signal again if the count value is not greater than the default value; and
resetting the count value to zero if the count value is greater than the default value.

4. The image output synchronization method according to claim 3, wherein the synchronization procedure further comprises:
resetting a frame number to zero before triggered by the count signal of the oscillator to control the frame control signal outputted to the camera according to the count value and the width of the count signal;
adding 1 to the frame number and determining whether the frame number is smaller than the designated frame rate if the count value is greater than the default value; and
waiting to be triggered by the count signal to control the frame control signal outputted to the camera according to the count value and the width of the count signal again when the frame number is smaller than the designated frame rate.

5. The image output synchronization method according to claim 4, wherein the frame control signal corresponds to an image generated by the camera, and the synchronization procedure further comprises:
determining whether the camera generates a next image when the frame number is not smaller than the designated frame rate; and
resetting the frame number to zero again when the camera generates the next image.

6. The image output synchronization method according to claim 3, wherein the default value is obtained according to a value of the frequency of the count signal divided by the designated frame rate.

7. The image output synchronization method according to claim 1, further comprising:
transmitting an interruption signal to a central processing unit by the clock generator at the same time of generating the synchronization signal.

8. The image output synchronization method according to claim 1, further comprising:
transmitting an interruption signal to a central processing unit by each one of the frame controllers at the same time of outputting the frame control signal.

9. An image output synchronization device, comprising:
a memory configured to store a configuration; and
a programmable logic circuit connected to the memory, and configured to load the configuration to perform:
configuring a count value according to a designated frame rate and a frequency of an oscillator generating a count signal by each one of a plurality of frame controllers;
generating a synchronization signal periodically and outputting the synchronization signal to the frame controllers by a clock generator; and
performing a synchronization procedure on a camera when triggered by the synchronization signal every time by each one of the frame controllers, with the synchronization procedure comprising: triggered by the count signal of the oscillator to control a frame control signal outputted to the camera according to the count value and a width of the count signal,
wherein each one of the frame controllers performs controlling the frame control signal outputted to the camera according to the count value and the width of the count signal comprises:
adding 1 to the count value;
calculating a current clock width according to the count value and the width;
determining whether the current clock width is smaller than a default clock width;
making the frame control signal have a high potential if the current clock width is smaller than the default clock width; and
making the frame control signal have a low potential if the current clock width is not smaller than the default clock width.

10. The image output synchronization device according to claim 9, wherein each one of the frame controllers performs calculating the current clock width according to the count value and the width comprises:
dividing the count value by the frequency of the count signal of the oscillator to obtain a quotient; and
multiplying the quotient with a default width parameter to obtain the current clock width, wherein the default width parameter is greater than zero.

11. The image output synchronization device according to claim 9, wherein the synchronization procedure further comprises:
determining whether the count value is greater than a default value after controlling the frame control signal;
waiting to be triggered by the count signal to control the frame control signal outputted to the camera according to the count value and the width of the count signal again if the count value is not greater than the default value; and
resetting the count value to zero if the count value is greater than the default value.

12. The image output synchronization device according to claim 11, wherein the synchronization procedure further comprises:
resetting a frame number to zero before triggered by the count signal of the oscillator to control the frame control signal outputted to the camera according to the count value and the width of the count signal;

adding 1 to the frame number and determining whether the frame number is smaller than the designated frame rate if the count value is greater than the default value; and waiting to be triggered by the count signal to control the frame control signal outputted to the camera according to the count value and the width of the count signal again when the frame number is smaller than the designated frame rate.

13. The image output synchronization device according to claim 12, wherein the frame control signal corresponds to an image generated by the camera, and after adding 1 to the frame number, each one of the frame controllers is further configured to perform:

determining whether the camera generates a next image; and resetting the frame number to zero again when the camera generates the next image, wherein determining whether the frame number is smaller than the designated frame rate is performed when determining the camera does not generate the next image.

14. The image output synchronization device according to claim 11, wherein the default value is obtained according to a value of the frequency of the count signal divided by the designated frame rate.

15. The image output synchronization device according to claim 9, wherein the clock generator is further configured to transmit an interruption signal to a central processing unit by the clock generator at the same time of generating the synchronization signal.

16. The image output synchronization device according to claim 9, wherein each one of the frame controllers is further configured to transmit an interruption signal to a central processing unit by each one of the frame controllers at the same time of outputting the frame control signal.

* * * * *